(12) United States Patent
Ishino et al.

(10) Patent No.: US 9,531,893 B2
(45) Date of Patent: Dec. 27, 2016

(54) SCREEN IMAGE PROVIDING APPARATUS, SCREEN IMAGE PROVIDING METHOD, AND COMPUTER READABLE MEDIUM

(71) Applicant: FUJI XEROX CO., LTD., Tokyo (JP)

(72) Inventors: Shigeki Ishino, Yokohama (JP); Teppei Aoki, Kamakura (JP); Takahiro Okayasu, Sagamihara (JP); Shinichiro Yamamoto, Kawasaki (JP); Masamune Oshitani, Tokyo (JP); Russell Neville, Portland, OR (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/657,138

(22) Filed: Mar. 13, 2015

(65) Prior Publication Data
US 2016/0227055 A1 Aug. 4, 2016

(30) Foreign Application Priority Data
Feb. 4, 2015 (JP) .................................. 2015-020631

(51) Int. Cl.
*H04N 1/00* (2006.01)
*G06F 3/0484* (2013.01)

(52) U.S. Cl.
CPC ......... *H04N 1/00411* (2013.01); *G06F 3/0484* (2013.01); *H04N 1/00244* (2013.01); *H04N 1/00511* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | |
|---|---|---|---|
| 7,275,213 | B2 | 9/2007 | Katano |
| 2008/0270911 | A1 | 10/2008 | Dantwala et al. |
| 2011/0145722 | A1 | 6/2011 | Kim |
| 2012/0033257 | A1 | 2/2012 | Okazawa |
| 2012/0233537 | A1 | 9/2012 | Kawabata |

(Continued)

FOREIGN PATENT DOCUMENTS

| | | |
|---|---|---|
| EP | 2273363 A1 | 1/2011 |
| JP | 2012037928 A | 2/2012 |
| JP | 2012191321 A | 10/2012 |

OTHER PUBLICATIONS

Communication from the Australian Patent Office issued May 9, 2016 in a counterpart Australian Application No. 2015201634.

*Primary Examiner* — Ngon Nguyen
(74) *Attorney, Agent, or Firm* — Sughrue Mion, PLLC

(57) ABSTRACT

There is provided an operation screen providing system including a relay apparatus and an operation screen providing apparatus. An acquiring unit acquires type information representing a type of a processing apparatus, and customization information representing how the processing apparatus is customized from a standard configuration of the type. A request unit requests the operation screen providing apparatus for standard operation screen information corresponding to the type information, when receiving an operation screen request from the processing apparatus. An operation screen providing unit customizes the standard operation screen information according to the customization information to generate individual operation screen information and provides the individual operation screen information to the processing apparatus.

16 Claims, 12 Drawing Sheets

(56) References Cited

U.S. PATENT DOCUMENTS

2013/0088741 A1\* 4/2013 Murata ................ H04N 1/4433
                                                  358/1.14
2014/0068454 A1\* 3/2014 Hirama ................ G06F 3/0484
                                                  715/744

\* cited by examiner

FIG. 2

| RELAY APPARATUS | ADMINISTRATOR ID (EMAIL ADDRESS) | GROUP (MANAGEMENT UNIT) | APPARATUS NAME | TYPE (MODEL) | COUNT VALUE | STATE |
|---|---|---|---|---|---|---|
| 0001 | Yamamoto@example.com | AB DEVELOPMENT DEPARTMENT ON 7TH FLOOR | PRINTER-A | Prt123 | 1250 SHEETS | NORMAL |
| | | | PRINTER-B | Prt124 | 945 SHEETS | OUT OF TONER |
| 0002 | Yamamoto@example.com | AB DEVELOPMENT DEPARTMENT ON 8TH FLOOR | PRINTER-P | Prt125 | 789 SHEETS | OUT OF ORDER |
| | | | PRINTER-Q | Prt123 | 345 SHEETS | NORMAL |
| | | | PRINTER-R | Prt123 | 456 SHEETS | SLEEP MODE |
| 0023 | Suzuki@example.com | ADMINISTRATION DEPARTMENT | PRINTER-X | Prt125 | 235 SHEETS | OUT OF ORDER |
| | | | PRINTER-Y | Prt124 | 468 SHEETS | NORMAL |
| | | | | | | |

FIG. 6

| TYPE INFORMATION | STANDARD UI |
|---|---|
| TYPE 1 | TYPE A |
| TYPE 2 | TYPE B |

FIG. 7

| APPARATUS ID | TYPE | CUSTOMIZATION CONTENTS |
|---|---|---|
| 001 | TYPE 1 | 1 (WITOUT FAX) |
| 002 | TYPE 1 | 2 (WITH EXEERNAL LINKAGE) |
| 003 | TYPE 2 | 1 (WITHOUT FAX) |
| 004 | TYPE 2 | 2 (WITH EXTERNAL LINKAGE) |
| 005 | TYPE 3 | 1 |
| ... | | ... |

FIG. 8

| TYPE INFORMATION | STANDARD UI | CUSTOMIZATIONCONTENTS | INDIVIDUAL UI |
|---|---|---|---|
| TYPE 1 | TYPE A | 1 (WITHOUT FAX) | TYPE A-1 |
| TYPE 1 | TYPE A | 2 (WITH EXTERNAL LINKAGE) | TYPE A-2 |
| TYPE 2 | TYPE B | 1 (WITHOUT FAX) | TYPE B-1 |
| TYPE 2 | TYPE B | 2 (WITH EXTERNAL LINKAGE) | TYPE B-2 |
| TYPE 3 | TYPE C | 1 (WITHOUT FAX) | TYPE C-1 |
| ... | | | ... |

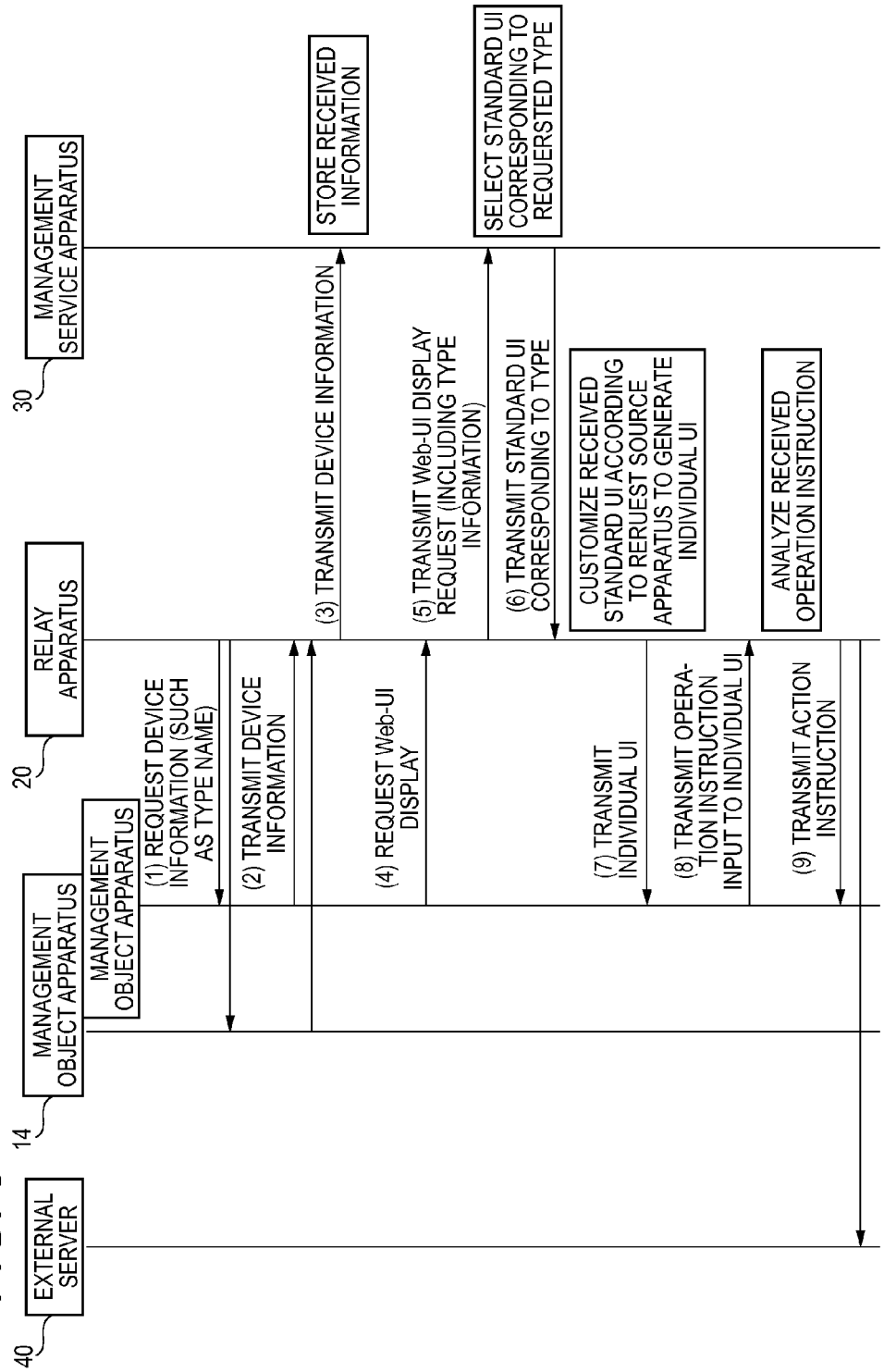

FIG. 10

| TYPE OF APPARATUS | ADDITIOANL FUNCTION | WIDGET ID |
|---|---|---|
| TYPE 1 | EXTERNAL LINKAGE | 1-1 |
| TYPE 3 | EXTERNAL LINKAGE | 1-2 |
| ... | ... | ... |
| TYPE 2 | EXTERNAL LINKAGE | 2-1 |
| TYPE 1 | STAPLING | 2-2 |
| TYPE 1 | EXTERNAL LINKAGE | 2-3 |
| TYPE 1 | EXTERNAL LINKAGE | 2-4 |
| ... | ... | ... |

FIG. 11

| WIDGET ID | WIDGET NAME | DISPAY NAME | ARRANGEMENT INDICATOR |
|---|---|---|---|
| 1-1 | TAB A | EXTERNAL LINKAGE | INSERTION INTO 1 OF TAB 1 OF TAMPLATE A |
| 1-2 | TAB B | EXTERNAL LINKAGE | INSERTION INTO 4 OF TAB 1 OF TAMPLATE A |
| 1-n | ... | ... | ... |
| 2-1 | BUTTON A | EXTERNAL LINKAGE | INSERTION INTO 4 OF TAMPLATE B |
| 2-2 | BUTTON B | STAPLING | INSERTION INTO 4 OF COPY TAB OF TAMPLATE A |
| 2-3 | BUTTON C | STORAGE DESTINATION | INSERTION INTO 5 OF EXTERNAL LINKAGE TAB OF TAMPLATE A |
| 2-4 | BUTTON D | STAPLING | INSERTION INTO 10 OF EXTERNAL LINKAGE TAB OF TAMPLATE A |
| 2-n | ... | ... | ... |
| 3-1 | α | AAA | INSERTION INTO COORDINATES (m, n) OF TAMPLATE A |
| 3-2 | β | BBB | INSERTION INTO COORDINATES (m, n) OF TAB 1 OF TAMPLATE A |
| 3-n | ... | ... | ... |

SCREEN IMAGE PROVIDING APPARATUS, SCREEN IMAGE PROVIDING METHOD, AND COMPUTER READABLE MEDIUM

CROSS-REFERENCE TO RELATED APPLICATIONS

This application is based on and claims priority under 35 U.S.C. §119 from Japanese Patent Application No. 2015-020631 filed on Feb. 4, 2015.

TECHNICAL FIELD

The present invention relates to an operation screen providing system, a relay apparatus, an operation screen providing method and a non-transitory computer readable medium.

SUMMARY

According to an aspect of the exemplary embodiments of the present invention, there is provided an operation screen providing system comprising: a relay apparatus and an operation screen providing apparatus, wherein the relay apparatus includes: an acquiring unit that acquires type information representing a type of a processing apparatus, and customization information representing how the processing apparatus is customized from a standard configuration of the type, from the image processing apparatus; a requesting unit that requests the operation screen providing apparatus for standard operation screen information corresponding to the type information acquired by the acquiring unit, if an operation screen request is received from the processing apparatus; and an operation screen providing unit that customizes the standard operation screen information provided from the operation screen providing apparatus in response to a request of the requesting unit, according to the customization information acquired by the acquiring unit, to generate individual operation screen information, and provides the generated individual operation screen information to the processing apparatus which is a source of the operation screen request, and wherein the operation screen providing apparatus includes a providing unit that provides the standard operation screen information corresponding to the type information to the relay apparatus in response to the request from the relay apparatus.

BRIEF DESCRIPTION OF THE DRAWINGS

Exemplary embodiments of the present invention will be described in detailed based on the following figures, wherein:

FIG. 2 is a view illustrating an example of data which is contained in a database of a management service;

FIG. 6 is a view illustrating an example of information on the correspondence relation between the types of management object apparatuses and standard UIs;

FIG. 7 is a view illustrating an example of information representing the types of management object apparatuses located on a local network and customization contents;

FIG. 8 is a view illustrating an example of information on the correspondence relation between combinations of the types of management object apparatuses and customization contents, and individual UIs corresponding to those combinations;

FIG. 9 is a view illustrating the flow of the UI screen providing method of the embodiment;

FIG. 10 is a view illustrating an example of information on the correspondence between the customization contents of management object apparatuses and widgets which need to be added to UI screens by customization (a table representing the correspondence between additional functions and widgets);

FIG. 11 is a view illustrating an example of information (a widget table) on the definitions of widgets which are used in UI screens;

DETAILED DESCRIPTION

Examples on System Configuration

Figure 1:
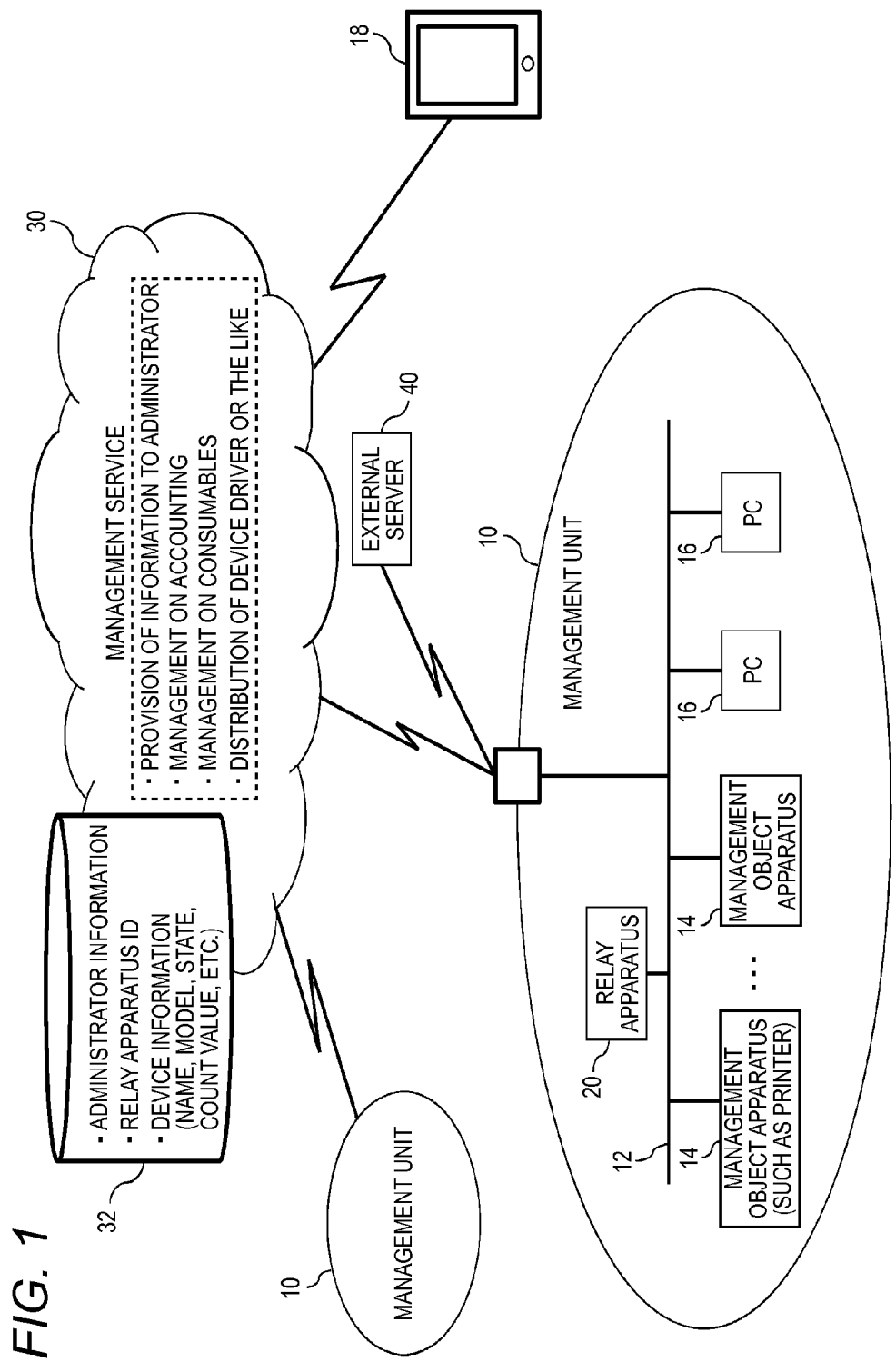
FIG. 1 is a view illustrating an example of a system to which a UI screen providing method of an embodiment is applied.

An example of a system to which a UI screen providing scheme of an embodiment of the present invention is applied will be described with reference to FIG. 1.

This system includes relay apparatuses 20 which are installed inside management units 10, respectively, and a management service 30 which is installed outside the management units 10.

Each management unit 10 is a collection of apparatuses such as computers which perform data communication through a local network 12 such as one local area network (LAN) or an intranet (or may be a group of users using those apparatuses), and may be one office, one factory, one home, or the like. Each relay apparatus 20 is connected to a corresponding local network 12. Further, one or more management object apparatuses 14 and one or more personal computers (PC) 16 are connected to each local network 12. Each local network 12 may use a wired scheme or a wireless scheme, or may use a combination of them. Each local network 12 is connected to the Internet (not shown) through a firewall, a gateway, or the like.

Each management object apparatus 14 is a processing apparatus to be a management object of this system. The processing apparatus is an apparatus that performs one or more predetermined processes for the user, displays the operation screen (user interface screen), and receives operation instructions for the one or more processes using the operation screen. One example of the processing apparatus is an image forming apparatus. A concept of image forming apparatus includes various apparatuses which print images on media, or form electronic image data (by reading documents) (those apparatuses may further transmit the electronic image data), like a printer, a multi-function apparatus (a multi-function apparatus having the functions of a copy machine, a printer, a scanner, and the like), a scanner, and a facsimile. Also, to each local network 12, management object apparatuses 14 of various kinds and various models (types) can be connected. The PCs 14 use those management object apparatuses 14 through the local networks 12.

Each relay apparatus 20 collects information necessary for management, from individual management object apparatuses 14 located on a corresponding local network 12, and provides the collected information to the management service 30. Also, each relay apparatus 20 may have a function of receiving an updated version of firmware for each of the models of management object apparatuses 14 located on a corresponding local network 12, or updated versions of device drivers such as a printer driver necessary for PCs 16 located on the corresponding local network 12 to control those individual models, from the management service 30. In this case, if a relay apparatus 20 receives an updated version of firmware or an updated version of a device driver, the relay apparatus 20 stores the received updated version in order to install the received updated version in management object apparatuses 14 and PCs 16 corresponding to the received updated version.

It also can be considered a case of using, as each relay apparatus 20, a PC 16 connected to a corresponding local network 12 and having a program installed therein for implementing the function (to be described in this specification) of the corresponding relay apparatus 20. However, in the present embodiment, as an example, the relay apparatuses 20 are designed as dedicated apparatuses in view of the convenience of operating, the solidity of the apparatus, and the like. In the case of configuring the relay apparatuses 20 as dedicated apparatuses, since the relay apparatuses 20 needs only to be able to execute only restricted programs necessary for the system of the present embodiment, their hardware performance such as CPU performance and storage capacity does not need to be very high. Therefore, it is possible to configure each relay apparatus 20 as an inexpensive apparatus having a relatively small size. Also, since each relay apparatus does not execute unspecific programs which are not assumed in advance, failures are unlikely to occur, and thus the user side basically does not need to perform maintenance work. Also, since provision of information to the user side is performed from the management service 30 through the Internet, each relay apparatus 20 does not need to have a user interface (UI) such as a display screen or an input unit.

Also, each relay apparatus 20 may provide a function which is not inherent in corresponding management object apparatuses 14, as an additional function, to the corresponding management object apparatus 14. This provision of an additional function will be described below in detail.

The relay apparatus 20 conforms to a protocol for remotely managing an apparatus by the management service 30 and the relay apparatus 20 can communicate with the management service 30 using the protocol. For example, TR-069 is known as such a protocol for remote management (but not limited thereto).

The management service 30 is provided on the Internet, and collects information of the individual management object apparatuses 14 from the relay apparatuses 20 located inside the management units 10 through the Internet, and uses the collected information to provide a service to the individual management units 10. The management service 30 may be a single server apparatus, or may be a system which is composed of a plurality of computers, like a cloud computing system. As an example of the service which the management service 30 provides, there is a service of providing information collected from a management unit 10 (such as the state or usage of the corresponding management unit 10), or two-dimensional information obtained by analyzing the collected information, to the administrator of the corresponding management unit 10. The administrator of a management unit 10 uses a mobile terminal 18, such as a smart phone or a tablet terminal, or a PC to log in to the management service 30 and view information on the corresponding management unit 10. Also, the management service 30 may provide one or more of a plurality of services including management on accounting for usage of each management object apparatus 14, management on the residual amounts or the like of consumables of each management object apparatus 14, distribution of the latest version of a device driver or firmware, and setting of various setting information in each management object apparatus 14. These services are just examples, and the management service 30 can provide various other services using the collected information.

The management service 30 has a database 32 for managing information on the individual management units 10. In the database 32, various information such as information on the administrator of each management unit 10 (such as the user ID of each administrator), the identification information (referred to as relay apparatus ID) of a relay apparatus 20 included in each management unit 10, and the device information of each management object apparatus 14 included in each management unit 10 are registered.

FIG. 2 shows an example of data having been registered in the database 32. In this example, in the database 32, in association with the relay apparatus ID of each relay apparatus 20, the user ID (administrator ID) of an administrator who manages the corresponding relay apparatus 20, the name (group name) of a management unit 10 where the corresponding relay apparatus 20 has been installed, and the device information of each management object apparatus 14 included in the corresponding management unit 10 have been registered. In this example, as each administrator ID, the email address of a corresponding administrator has been used. Also, the device information of each management object apparatus 14 includes the name (printer name) and type (model) of the corresponding management object apparatus 14, a count value representing the number of print output sheets of the corresponding management object apparatus 14, and information (an information item "STATE") representing the operation state of the corresponding management object apparatus 14. Also, in the database 32, the address information of each relay apparatus 20 is contained in order to perform communication with the corresponding relay apparatus 20, but is not shown in FIG. 2 in order to avoid complexity.

In the example of FIG. 2, for example, a relay apparatus 20 having a relay apparatus ID "0001" has been registered in association with an administrator having a user ID "Yamamoto@example.com", and has been installed in a group (management unit) having a name "AB DEVELOPMENT DEPARTMENT ON THE SEVENTH FLOOR". Further, the corresponding relay apparatus 20 is connected to the local network 12 to which two management object apparatuses 14 having names "Printer-A" and "Printer-B" are connected, and the types (models) of the corresponding management object apparatuses 14 are "Prt123" and "Prt124", respectively. Furthermore, the management object apparatuses 14 having the names "Printer-A" and "Printer-B" have current state values "NORMAL" and "OUT OF TONER", respectively.

Also, in the example of FIG. 2, two management units 10 corresponding to two relay apparatus IDs "0001" and "0002" are managed by the same administrator having the administrator ID "Yamamoto@example.com".

In addition, the management service 30 also has a function as an operation screen providing apparatus for providing an operation screen (UI screen) to the management object apparatuses 14. With the function as the operation screen providing apparatus, the management service 30 cooperates with the relay apparatus to provide the UI screen in which the customization of each management object apparatus 14 is reflected to the management object apparatuses 14. The function as the operation screen providing apparatus will be described later.

An external server 40 is a server which is located outside the local networks 12 (for example, on the Internet), and provides an information processing service such as an image processing service to the management object apparatuses 14. The external server 40 is used in linkage processes to be described below. Linkage processes using the external server 40 will be described below in detail.

The above-described management service 30 collects the information from the relay apparatus 20, for example, using the remote management protocol. For example, by using the remote management protocol such as TR-069, it is possible to control the relay apparatus 20 from the management service 30 through the firewall which separates the local network 12 from the Internet and to exchange information. Since the management object apparatus 14 is separated from the external Internet by the firewall, the management object apparatus 14 cannot directly transmit information to a system such as the management service 30 through the Internet. However, the management object apparatus 14 can transmit the own device information to the management service 30 through the relay apparatus 20.

The management service 30 may update the firmware or the various setting information of the relay apparatus 20, using the remote management protocol.

The information to be provided to the management object apparatus 14 or the other apparatuses on the local networks 12 (for example, the PC 16) may be provided from the management service 30 to the relay apparatus 20 using the remote management protocol. In this case, the relay apparatus 20 may temporarily store that information and then provide the information to the management object apparatus 14 in a push method or in a pull method in response to a request from the management object apparatus 14. The information to be provided is, for example, a device driver (such as a printer driver) used for control the management object apparatus 14 by the PC 16 or the updates thereof.

<Provision of Additional Function to Management Object Apparatus>

Until now, an example of the configuration of a system to which the present embodiment is applied has been described. Subsequently, an additional function which a relay apparatus 20 provides to a management object apparatus 14 will be described.

The term "additional function" means a function which is not inherent in the management object apparatuses 14 and can be provided by the relay apparatus 20. Examples of an additional function which a relay apparatus 20 provides to a management object apparatus 14 include a linkage process function. The term "linkage process function" means a function of linking a process of a management object apparatus 14 with image processing of another apparatus. An example of a linkage process function is a function in which an image forming apparatus serving as the management object apparatus 14 generates image data by a scanning process, and the external server 40 located outside the local networks 12 (for example, on the Internet) performs an optical character recognition (OCR) process on the image data, thereby acquiring text data as the recognition result, and registers the text data in association with the original image data in a designated document management system. A process of linking a process of a management object apparatus 14 located in a local network 12 with another apparatus (for example, the external server 40) located outside the local networks 12 like in the above example is also referred to as an external linkage. Naturally, in a linkage process, it is possible to link a process of a management object apparatus 14 with another apparatus located in the same local network 12.

Examples of a system for making it possible to use an image forming apparatus to use a linkage process function include a system of the applicant of the present invention (hereinafter, referred to as a linkage system according to the related art) disclosed in Japanese Patent Application Laid-Open No. 2004-112636 or the like. In this system, using data which is called a job order and defines a linkage process, an image forming apparatus is linked with another apparatus. A linkage process of the present embodiment may be implemented using the same scheme as the system according to the related art. However, the mechanism of the linkage process disclosed in Japanese Patent Application Laid-Open No. 2004-112636 or the like is just one example, and it is natural that any other mechanism can be used. In FIG. 1, only one external server 40 is shown as an apparatus to be linked with a process of a management object apparatus 14. However, it is natural that a plurality of linkable apparatuses can exist. Also, it is possible to link a process of a management object apparatus 14 with processes of a plurality of apparatuses including the external server 40 and apparatuses located inside the local networks 12, like in a workflow.

In the above described linkage system according to the related art, the image processing apparatus corresponds to the linkage process. That is, the image processing apparatus can handle data defining a linkage process and called a job order, and has a function of generating a user interface (UI) screen according to the job order and requesting a linkage destination apparatus such as the external server 40 indicated in the job order to perform information processing if a user issues an instruction by operating the UI screen.

In contrast to this, according to an aspect of the present embodiment, a relay apparatus 20 provides a linkage process function which is not inherent in a management object apparatus 14, to the management object apparatus 14. In order to provide the linkage process function, for example, the relay apparatus 20 provides a user interface (UI) screen including a graphical user interface (GUI) component (for example, a button) for instructing a linkage process, to the management object apparatus 14. This GUI component is associated with a link to a linkage process to be performed in the relay apparatus 20. If the user touches the GUI component on the UI screen displayed on the operation screen of the management object apparatus 14, the management object apparatus 14 transmits a request to a link destination (the linkage process function of the relay apparatus 20) indicated by the link. For example, a UI screen described in a standard language such as HyperText Markup Language (HTML) can be displayed by a management object apparatus 14 having a screen display function based on the standard. If the GUI component on the UI screen is touched, according to the link (uniform resource locator (URL)) associated with the GUI component, a HyperText Transfer Protocol (HTTP) request for calling the linkage process function is transmitted from the management object apparatus 14 to the relay apparatus 20. The called linkage process function of the relay apparatus 20 controls the relay apparatus 20 and another apparatus such as the external server 40, thereby implementing the linkage process function. For example, it is considered a case where the user uses the UI screen on the management object apparatus 14 to instruct performance of a linkage process in which the management object apparatus 14 acquires an image by scanning, and the external server 40 performs an OCR process on the image, thereby acquiring text data, and stores the text data in a document management system located on the Internet. In this case, if receiving that instruction from the management object apparatus 14, the relay apparatus 20 instructs the management object apparatus 14 to scan a document and returns an image as the scan result to the relay apparatus 20. If the scan result image is received as a response to the instruction, according to information for (for example, a job order) defining the instructed linkage process, the relay apparatus 20 transmits the image to the external server 40 for OCR, and requests the external server 40 to perform an OCR process on the image. If the result data of the OCR is received as a response to the request, the relay apparatus 20 transmits the OCR result data to a document management system indicated in the information defining the linkage process, and registers the OCR result data in the document management system.

In a case of using the mechanism of the job-order-based linkage system according to the related art, the relay apparatus 20 processes the job order, thereby implementing the linkage process according to the job order. Since the management object apparatus 14 cannot process the job order, the relay apparatus 20 processes the job order in place of the management object apparatus 14, and with respect to the process of the management object apparatus 14 represented in the job order, the relay apparatus 20 instructs the management object apparatus 14 to perform that process.

<Provision of UI for Additional Function>

Subsequently, a process of providing a UI screen for an additional function as described above to a management object apparatus 14 will be described.

An additional function which is provided from a relay apparatus 20 to a management object apparatus 14 is not a function which is inherent in the management object apparatus 14, and thus the management object apparatus 14 does not have a UI for receiving an instruction to perform the additional function. For this reason, in the present embodiment, a UI screen usable to instruct performance of the additional function is provided from the external to the management object apparatus 14. The provision of the UI screen is realized by the cooperation of the function of the management service 30 as the operation screen providing apparatus with the relay apparatus 20. An example of the UI provision for the additional function by this cooperation will be described hereinafter in detail.

In the present embodiment, the management service 30 provides the basic form (referred to as the "standard UI") of a UI screen for an additional function. Further, a relay apparatus 20 customizes the standard UI according to the configuration of each management object apparatus 14, thereby generating a UI screen (referred to as an "individual UI") appropriate for the corresponding management object apparatus 14, and provides the individual UI to the corresponding management object apparatus 14.

Hereinafter, the mechanism of the UI provision will be described.

The management service 30 contains a standard UI for each of the types, that is, models of the management object apparatuses 14, and if a request is received from a relay apparatus 20, the management service 30 provides a standard UI corresponding to the type of a management object apparatus 14 which is an object. Standard functions of apparatuses and the display capabilities of consoles (such as resolution and color/monochrome display) may differ depending on models. Therefore, a standard UI is prepared for each of the types of the management object apparatuses 14.

Figure 3:
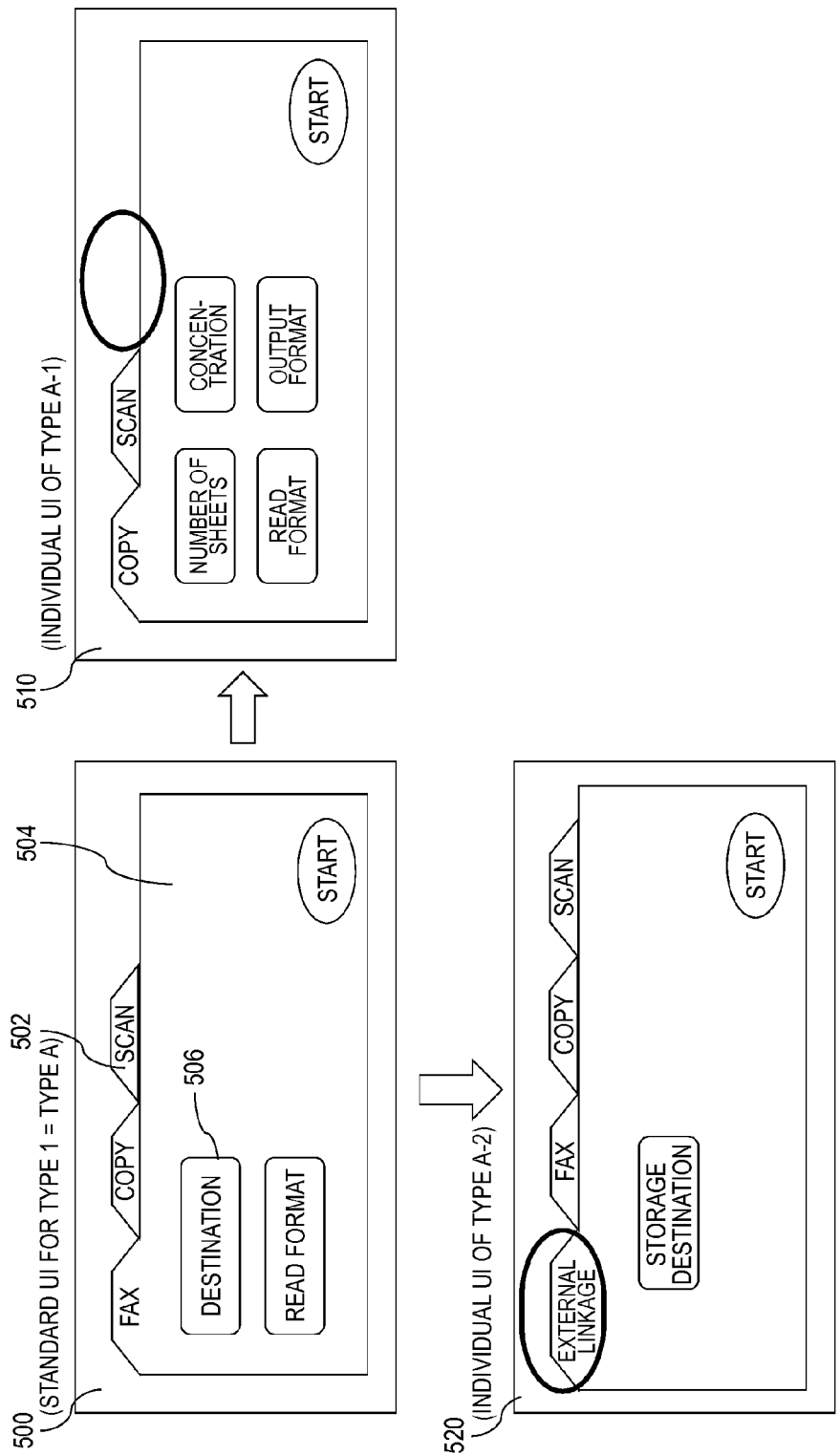
FIG. 3 is a view illustrating a standard interface (UI) and examples of individual UIs obtained by customizing that standard UI.

For example, a standard UI 500 of a management object apparatus 14 of a type "TYPE 1" shown in FIG. 3 has pages 504 with tabs 502 for functions "FAX", "COPY", and "SCAN". In each page 504, there are shown buttons 506 usable to instruct various operations (such as setting or function performance start) relative to a corresponding function. In the example of FIG. 3, the page 504 of the "FAX" function is displayed on the screen, and in the page 504 of the "FAX" function, there are shown buttons 506 usable to call another screen for setting an item such as "DESTINATION" or "READ FORMAT", and a "START" button 506 usable to instruct start of FAX transmission.

Figure 4:
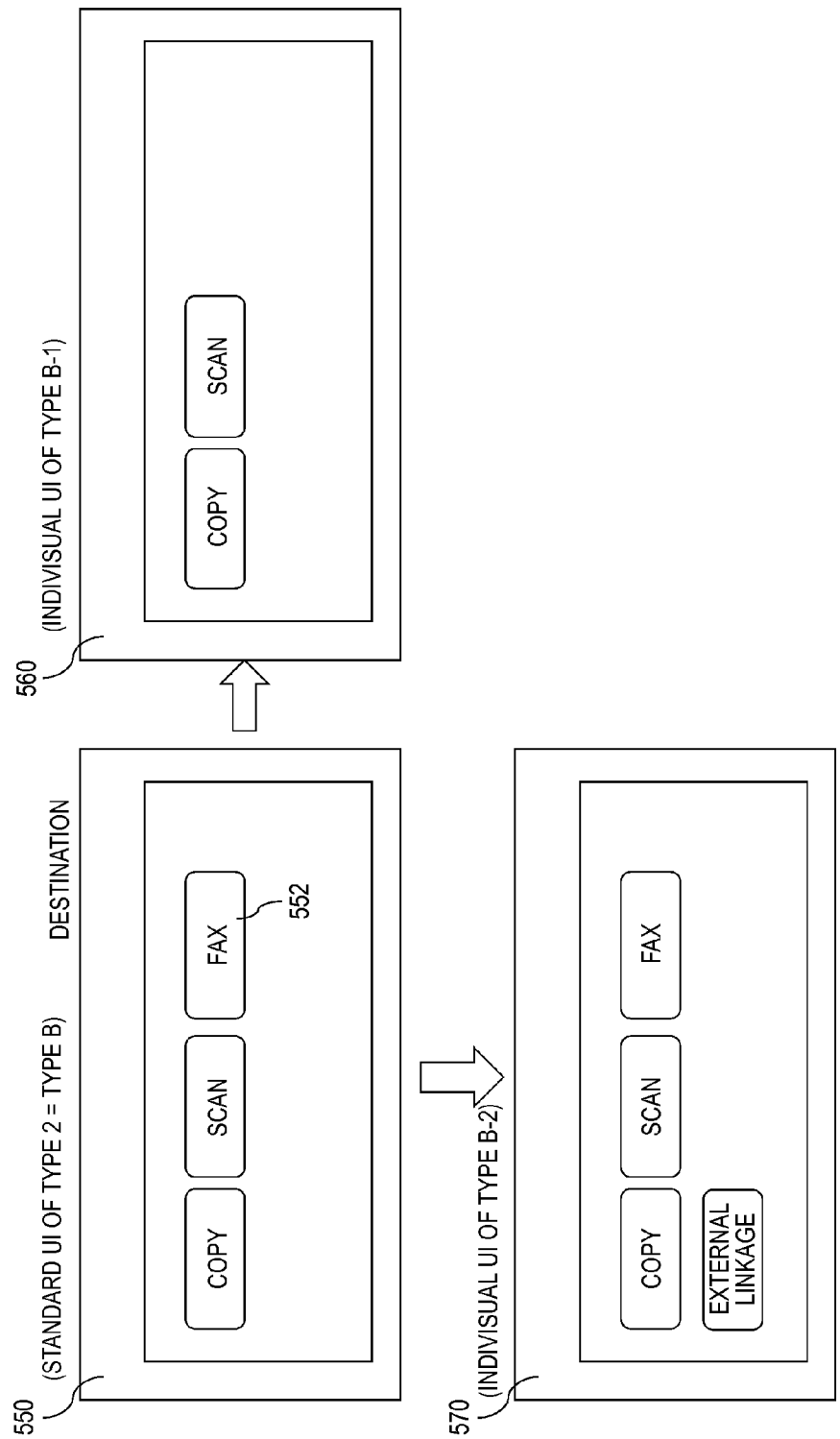
FIG. 4 is a view illustrating another standard interface (UI) and examples of individual UIs obtained by customizing that standard UI.

Meanwhile, since the display area of the display of a type "TYPE 2" is smaller than that of the type "TYPE 1", a management object apparatus 14 of the type "TYPE 2" cannot display a large tap-switch-type screen as exemplified in FIG. 3. Although the management object apparatus 14 of the type "TYPE 2" can display a tap-switch-type screen, tabs and buttons become smaller and thus it is difficult to operate the screen. For this reason, as shown in FIG. 4, in an individual UI 550 of a management object apparatus 14 of the type "TYPE 2", buttons 552 representing the functions "FAX", "COPY", and "SCAN" are displayed in a main screen. If any one of the buttons 552 is pushed (touched), the display is switched to another screen usable to input a detailed operation instruction relative to a function corresponding to the pushed button 552. In the screen of the type "TYPE 2", since the whole display area of the display is used to display the group of the buttons 552, the buttons 552 are displayed in a large size, and thus it is easy to select a button 552.

By the way, examples of the management object apparatuses 14 include image forming apparatuses, particularly, multi-function apparatuses, some of which can be subject to customization such as addition or removal of functions. The user reduces the purchase price by removing unnecessary functions, or improves convenience by adding functions (for example, an apparatus for post-processing such as stapling). Therefore, apparatuses of the same type may be customized so as to have different functions. A standard UI does not include any GUI component relative to an added function, and thus cannot receive any operation relative to added functions. Also, the standard UI contains GUI components relative to removed functions, and thus causes a user to mistake the removed functions as being usable.

For this reason, in the present embodiment, a standard UI corresponding to the type of each management object apparatus 14 is customized according to the customized state of the corresponding management object apparatus 14, whereby an individual UI is generated so as to be appropriate for the composition of the functions of the corresponding management object apparatus 14. In this case, if the management service 30 provides customized individual UIs to the individual management object apparatuses 14, the load of the management service 30 for providing the individual UIs is large. For this reason, in the present embodiment, each relay apparatus 20 is put in charge of standard UI customization, whereby the load of the management service 30 is reduced.

In FIG. 3, there are shown an individual UI 510 which is obtained by customizing the standard UI 500 of the type "TYPE 1" for a type having no FAX function, and an individual UI 520 which is obtained by customizing the standard UI 500 for a type additionally having an external linkage function. The individual UI 510 is obtained by removing a page for the FAX function from the standard UI 500, and the individual UI 520 is obtained by adding a page for the external linkage function to the standard UI 500.

In FIG. 4, there are shown an individual UI 560 which is obtained by customizing the standard UI 550 of the type "TYPE 2" for a type having no FAX function, and an individual UI 570 which is obtained by customizing the standard UI 550 for a type additionally having an external linkage function. A button corresponding to an added or removed function, and a screen to be called by the corresponding button are added or removed, whereby customization on the standard UI 550 of the type "TYPE 2" is performed.

Figure 5:
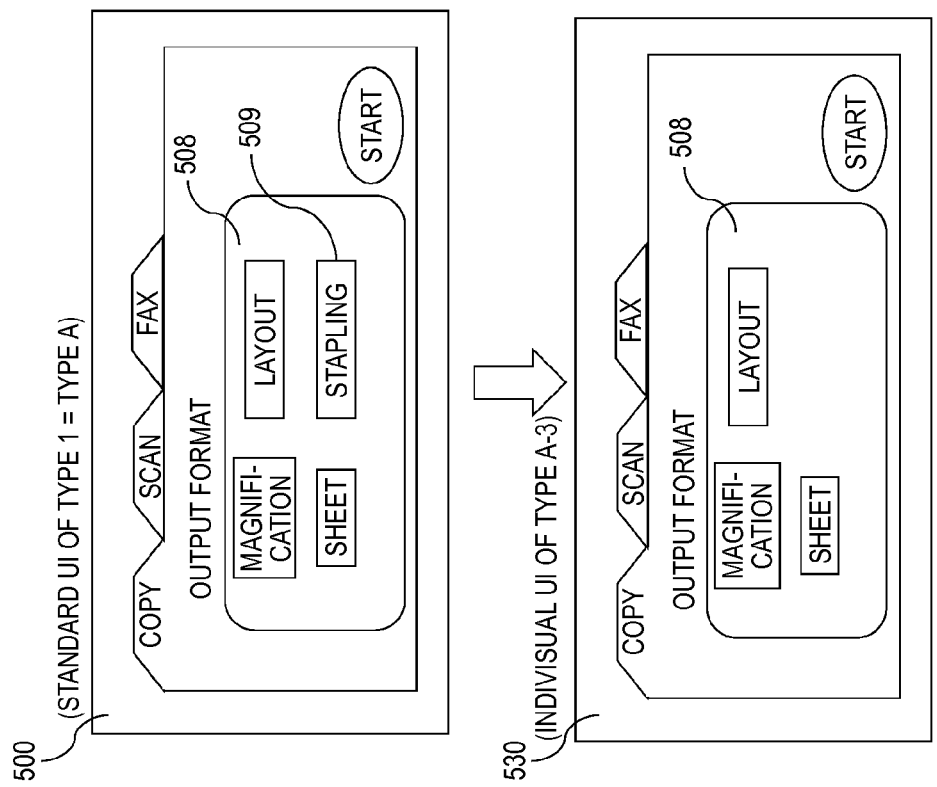
FIG. 5 is a view illustrating another standard interface (UI) and an example of an individual UI obtained by customizing that standard UI.

The UI customization exemplified in FIG. 3 is performed by performing addition or removal of pages 504 in units of a function. In contrast to this, FIG. 5 shows an example in which removal from the pages 504 is performed in units of a GUI component. That is, since the standard configuration of an apparatus of the type "TYPE 1" has a stapling function, the corresponding standard UI 500 includes an output format setting page 508, which is related to a copying function and includes a "STAPLING" button 509. In contrast to this, an individual UI 530 for a customized model obtained by removing the stapling apparatus from the type "TYPE 1" does not include the "STAPLING" button 509 in the output format setting page 508 for the copying function.

For the UI screen providing mechanism described above, the management service 30 contains the correspondence between the types of the management object apparatuses 14 and the standard UIs as shown in FIG. 6.

Also, each relay apparatus 20 contains apparatus ID information (identification information), type information, and customization contents information as shown in FIG. 7, for each of management object apparatuses 14 located on a local network 12 where the corresponding relay apparatus 20 is located. The customization contents information of a management object apparatus 14 represents which function has been added to or removed from the standard configuration of the type including the corresponding management object apparatus 14. In the example of FIG. 7, the customization contents information of each management object apparatus 14 is represented by a pattern number representing an addition/removal pattern.

For example, a pattern number "1" represents customization contents in which the FAX function is removed from the standard configuration, and a pattern number "2" represents customization contents in which the external linkage function is added to the standard configuration. In addition, there may be customization contents in which a plurality of functions is added to or removed from the standard configuration, and customization contents including both of function addition and function removal. In this case, pattern numbers may be assigned to those possible customization contents, respectively. In the example of FIG. 7, for example, in a case of a management object apparatus 14 having an apparatus ID "001", the type information has a value "TYPE 1", and the customization contents information has a value "1" (representing removal of the FAX function).

In FIG. 7, the customization contents are represented by pattern numbers. However, this is just an example. Alternatively, the customization contents can use various other expression forms. For example, the customization contents may be represented by a set of the identification information of functions which are added to the standard configuration and the identification information of functions which are removed from the standard configuration. Also, each relay apparatus 20 may contain a table specifying the type of an individual UI corresponding to each management object apparatus 14 on the basis of a combination of the type and customization contents of the corresponding management object apparatus 14 as shown in FIG. 8. In this example, each relay apparatus 20 may customize a standard UI corresponding to the type of each management object apparatus 14 according to customization contents, thereby generating an individual UI, and provide the generated individual UI to the corresponding management object apparatus 14 while storing the generated individual UI in association with a type number corresponding to a combination of the type and customization contents of the corresponding management object apparatus 14. Thereafter, if a UI screen is requested by a management object apparatus 14 which is located on a local network 12 where the relay apparatus 20 is located and has the same combination of type information and customization contents information as the stored combination, the relay apparatus 20 may provide the individual UI stored in association with a type number corresponding to the corresponding combination.

<Flow of UI Screen Display Process>

Subsequently, an example of the flow of processes for displaying a UI screen on a management object apparatus 14 in the present embodiment and processes which are performed according to operations on the UI screen will be described with reference to FIG. 9.

(1) A relay apparatus 20 requests device information (such as information items "TYPE", "APPARATUS NAME", "OPTION COMPOSITION" (customization contents), and "STATE") from each management object apparatus 14 located on a local network 12 to which the corresponding relay apparatus 20 is connected. The relay apparatus 20 performs that request using, for example, a Simple Network Management Protocol (SNMP).

(2) Each management object apparatus 14 transmits its device information to the relay apparatus 20. For example, each management object apparatus 14 has a database called a Management Information Base (MIB), and contains its device information in the MIB, and updates the contents of the device information in response to a change in a state (for example, the number of output sheets). In response to the device information request from the relay apparatus 20, each management object apparatus 14 transmits the device information stored in the MIB. If the device information is acquired from each management object apparatus 14, the relay apparatus 20 stores the device information. In terms of a UI screen providing process, the relay apparatus 20 stores a combination of the items "APPARATUS ID", "TYPE", and "CUSTOMIZATION CONTENTS" relative to each management object apparatus 14 and included in the acquired device information (a table shown in FIG. 7).

(3) The relay apparatus 20 transmits the device information of each management object apparatus 14 to the management service 30. At this time, the relay apparatus 20 may transmit the device information in association with its relay apparatus ID. If the device information of each management object apparatus 14 is received from the relay apparatus 20, the management service 30 registers the corresponding information in a section of the database 32 corresponding to the relay apparatus ID of the relay apparatus 20.

Also, in order to monitor a change in the state of each management object apparatus 14, the device information collecting process of the steps (1) to (3) is repeatedly performed, for example, regularly. If device information acquired in the second or subsequent device information collection relative to each management object apparatus 14 includes an item having a value different from that of device information stored in association with the corresponding management object apparatus 14 in the database 32, the management service 30 updates the stored value with the acquired value.

(4) Meanwhile, if a user issues a Web-UI display instruction using a management object apparatus 14, the corresponding management object apparatus 14 transmits a Web-UI display request to a relay apparatus 20 located on the same local network 12.

Here, the term "Web-UI" means a UI screen which the management service 30 and a relay apparatus 20 cooperatively provides to a management object apparatus 14 according to the mechanism of the present embodiment. Each management object apparatus 14 can display not only its original UI screen (referred to as the "native UI") stored in its own storage unit, but also a UI screen which is provided from the external. In this example, a UI screen from the external is provided through the World Wide Web (Web), and thus is referred to as a Web-UI. Each native UI includes a GUI component such as a button for calling a Web-UI, and a user can operate the GUI component, thereby instructing Web-UI display.

A Web-UI display request which is transmitted from a management object apparatus 14 to a relay apparatus 20 includes the apparatus ID of the corresponding management object apparatus 14.

(5) If the Web-UI display request is received from the management object apparatus 14, the relay apparatus 20 specifies the type (model) of the relay apparatus 20 using information (see FIG. 7) contained. Thereafter, the relay apparatus 20 transmits a Web-UI display request corresponding to the specified type, to the management service 30.

(6) The management service 30 reads data on a standard UI corresponding to the type designated in the Web-UI display request from the relay apparatus 20, from its own storage unit, and transmits the standard UI data to the relay apparatus 20.

(7) If the standard UI is received from the management service 30, the relay apparatus 20 customizes the standard UI according to the customization contents of the management object apparatus 14 which is the request source, thereby generating an individual UI. For example, if the management object apparatus 14 has been obtained by adding any function to the standard configuration of the corresponding type, the relay apparatus 20 adds a GUI component for that function to the standard UI, thereby generating an individual UI.

Thereafter, the relay apparatus 20 transmits the generated individual UI to the management object apparatus 14 which is the request source.

(8) The management object apparatus 14 displays the received individual UI. A user inputs an operation instruction to the individual UI. The operation instruction input to the individual UI is transmitted to the relay apparatus 20.

(9) If the operation instruction is received from the individual UI of the management object apparatus 14, the relay apparatus 20 analyzes the operation instruction, and transmits an action instruction to an apparatus necessary to perform a process corresponding to the operation instruction. For example, if the operation instruction is for instructing a process of the single management object apparatus 14 such as scanning or copying, the relay apparatus 20 instructs the management object apparatus 14 to perform the process according to the operation instruction. Meanwhile, if the operation instruction is for instructing a process of the external server 40, the relay apparatus 20 instructs the external server 40 to perform that process. Also, if the operation instruction is for requesting a process flow which is composed of processes of a plurality of apparatuses, according to the process flow, the relay apparatus 20 instructs each apparatus to perform a corresponding process. For example, in a case where the operation instruction is for requesting a process flow in which the management object apparatus 14 scans a document, thereby acquiring an image, and the external server 40 performs an OCR process on the image, thereby acquiring text data, and a predetermined document management system registers the text data, the relay apparatus 20 first instructs the management object apparatus 14 to perform scanning, thereby acquiring the scan result image, and then instructs the external server 40 to perform an OCR process on the scan result image, thereby acquiring the text data as the process result, and finally instructs the document management system to register the text data. As described above, in the present embodiment, the management service 30 needs only to provide a standard UI corresponding to the type of each management object apparatus 14, and thus does not need to correspond to an individual UI corresponding to the customized state of each management object apparatus 14.

EXAMPLES OF UI SCREEN CUSTOMIZING METHOD

First Example

In this example, each relay apparatus 20 contains information necessary to add widgets relative to functions which can be added to the standard configuration of each management object apparatus 14, in the storage unit of the corresponding relay apparatus 20. This information hereinafter will be referred to as change information.

Also, the term "widget" means a GUI component (such as a button, a scroll bar, or a menu) for receiving an input from a user, and includes a large component which is composed of a plurality of components (for example, a page including a plurality of buttons or a collection of those pages).

The change information may be stored in a storage unit included in each relay apparatus 20 during shipment of the corresponding relay apparatus 20, or may be transmitted from the management service 30 to each relay apparatus 20 through an external network line such as the Internet, and be stored in the corresponding relay apparatus 20. Also, in a case where it is necessary to update the change information, like a case of requiring a new UI for a newly-developed function which is provided to a management object apparatus 14 (for example, a new function which is provided by a relay apparatus 20), the change information in the corresponding relay apparatus 20 is updated, for example, in response to an instruction from the management service 30.

Figure 12:
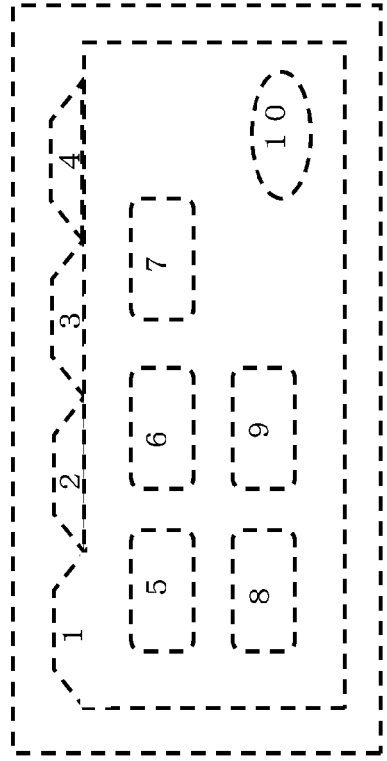
FIG. 12 is a view illustrating an example of a UI screen template.
Figure 13:
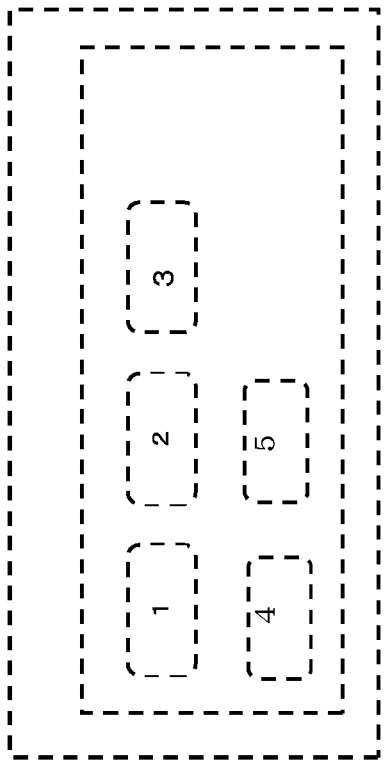
FIG. 13 is a view illustrating another example of the UI screen template.

In one example, the change information includes a table representing the correspondence between additional functions and widgets (see FIG. 10), a widget table (see FIG. 11), and template information (see FIGS. 12 and 13).

The table representing the correspondence between additional functions and widgets is a table representing the correspondence among the type of each management object apparatus 14, a function which is added to the standard configuration for apparatuses of the corresponding type by customization, and one or more widgets necessary as a UI for the additional function. An example of this table is shown in FIG. 10. As shown in the table shown in FIG. 10, for example, with respect to an apparatus of a type "TYPE 1" to which the external linkage function has been added by customization, it is necessary to add three widgets having widget IDs "1-1", "2-3", and "2-4" to the standard UI. In a case of an apparatus to which a plurality of functions has been added by customization, with respect to each of those additional functions, a widget group shown in the table is added to the standard UI.

The widget table is a table in which data defining individual widgets has been registered. In the example of FIG. 11, in the widget table, in association with the ID of each widget, the name ("WIDGET NAME"), display name, and arrangement indicator of the corresponding widget have been registered. A widget name is the identification name of a widget, and is associated with information (not shown) defining the display form of the corresponding widget (such as the shape, the size, the color, and a display change in a case where an touch operation is performed), an action which is performed in a case where the corresponding widget is operated, and the like. Also, in a case of using a template in which candidates for the positions and shapes of arrangeable widgets have been determined in advance like templates exemplified in FIGS. 12 and 13, it is unnecessary to define the forms of widgets in the widget table. An action which is performed in a case where a widget is operated may be represented by a URL or the like for calling a process of a relay apparatus 20. A display name is a letter string which is displayed at a predetermined position of a widget in a case where the corresponding widget is incorporated in a UI screen (that is, a case where the corresponding widget is added to a standard UI), and expresses an operation corresponding to the corresponding widget for a user. An arrangement indicator is information representing where a corresponding widget is disposed on the UI screen. In this example, an arrangement indicator is described in the form of an ID number representing a widget arrangement position in a template (to be described below) (for example, IDs "1-1" to "2-4").

Also, for example, a large widget may be generated in advance by gathering a component-level widget group for an external linkage (for example, IDs "1-1", "2-3", and "2-4" for the type "TYPE 1") together, and be registered in the widget table (an ID "3-1" of the table of FIG. 11).

Template information is information representing candidates for widget arrangement positions. Examples of the template information are shown in FIGS. 12 and 13. The template information may represent only widget arrangement positions, or may represent not only widget arrangement positions but also the shapes, sizes, and types (such as a button type and a slide bar type) of arrangeable widgets.

The template exemplified in FIG. 12 is for an apparatus having a relatively large-area display capable of tab type display, and shows candidates (ID numbers 1 to 4) for tabs which can be displayed, and candidates (ID numbers 5 to 10) for buttons which can be displayed. Each candidate defines the shape, size, and position of a corresponding widget. The arrangement indicators of the widgets in the above described widget table refer to the ID numbers of the candidates in the template. Also, although not shown in FIG. 12, even with respect to each of hidden tabs 2 to 4, candidates for buttons are arranged in a page including the corresponding tab.

The template exemplified in FIG. 13 is for an apparatus having a relatively small-area display in which tab type display is not practical, and shows candidates for buttons which can be displayed. Even in this example, each candidate defines the shape, size, and position of a corresponding button.

In the examples of FIGS. 12 and 13, since the template information represents the shapes, sizes, and positions of the widgets, even if a widget contains information on the shape and size of a button or the like, the corresponding widget is changed so as to have the same shape and size as those represented by the template information, and then is arranged at a corresponding position. Also, in the above described example, in a case where information of a widget and information of a template compete with each other, the information of the template is prioritized. However, the information of the widget may be prioritized.

The flow of a process of a relay apparatus 20 to customize the standard UI 500 shown in FIG. 3, thereby generating the individual UI 520, will be described. In this example, the relay apparatus 20 recognizes that the type of a management object apparatus 14 having issued a Web-UI display request is "TYPE 1", and the external linkage function has been added to the standard configuration of the corresponding type, on the basis of change information contained in the relay apparatus 20. If receiving the standard UI of "TYPE 1" from the management service 30, the relay apparatus 20 recognizes that it is necessary to add three widgets having widget IDs "1-1", "2-3", and "2-4" for the additional function "EXTERNAL LINKAGE" of "TYPE 1", on the basis of the table representing the correspondence between additional functions and widgets (FIG. 10). According to this recognition, the relay apparatus 20 reads information on the widget IDs "1-1", "2-3", and "2-4" from the widget table (FIG. 11), and adds the three widgets to the standard UI according to the read information. That is, the relay apparatus 20 reads a widget "TAB A" corresponding to the ID "1-1", from the storage unit, and changes the display name of the corresponding widget to "EXTERNAL LINKAGE", and then inserts the corresponding widget into a position located in a tab 1 of a template A and having an ID number 1. Subsequently, the relay apparatus 20 reads a widget "BUTTON A" corresponding to the ID "2-3", from the storage unit, and changes the display name of the corresponding widget to "STORAGE DESTINATION", and then inserts the corresponding widget into a position located in an external linkage tab (that is, a page corresponding to a tab having the ID "1-1") of the template A and having an ID number 5. Next, the relay apparatus 20 reads a widget "BUTTON C" corresponding to the ID "2-4", from the storage unit, and changes the display name of the corresponding widget to "START", and then inserts the corresponding widget into a position located in the external linkage tab of the template A and having an ID number 10. Also, in this example, the changing processes are performed in the ascending order of the ID numbers of the widgets. However, this is just one example. The relay apparatus 20 may contain information on what is the order of IDs to perform the changing processes, as table information, or may be configured so as to be able to perform the changing processes later.

Until now, the UI customization mechanism in a case where a function has been added to the standard configuration of a type (model) has been described. However, UI customization in a case where a function has been removed from the standard configuration is simpler. With respect to a function having been removed from the standard configuration, the relay apparatus 20 needs only to remove data on a widget corresponding to the removed function, from the standard UI data received from the management service 30. In order for this widget removal, the standard configuration needs only to include at least one removable function, and the relay apparatus 20 needs only to contain a table representing the correspondence between each removable function and a widget. This table may have the same form as that of the table of FIG. 10 representing the correspondence between additional functions and widgets.

Second Example

In this example, the management service 30 provides full-version UI screen data to the relay apparatus 20. The full-version UI screen data includes a widget group with respect to each of all functions which are usable by the type of the management object apparatus 14 which is the source of the Web-UI display request. Thereafter, in a customizing process, the relay apparatus 20 removes widget data relative to each function which the management object apparatus 14 does not have, from the full-version UI screen data, thereby generating an individual UI. If there is a management object apparatus 14 to which all available functions have been added, the relay apparatus 20 provides the full-version UI screen data as an individual UI to the corresponding management object apparatus 14. In order for this removal, with respect to each of the types (models) of the management object apparatuses 14, the relay apparatus 20 needs only to contain information on the correspondence between all functions which are usable in the corresponding type and widgets corresponding to the functions, and a list of functions which are included in the standard configuration of the corresponding type. The management object apparatus 14 which is the source of the Web-UI display request has functions obtained by performing addition or removal of some functions on a function group included in the standard configuration of the type of the corresponding apparatus according to the customization contents of the corresponding apparatus. With respect to any function which is not included in a function group included in the management object apparatus 14 which is the source of the Web-UI display request and obtained in the above described way, the relay apparatus 20 can remove widgets relative to the corresponding function, from the full-version UI screen data, thereby generating an individual UI for the corresponding management object apparatus 14.

<Example of Functional Configurations of Apparatuses>

Subsequently, examples of the functional configurations of the apparatuses constituting the system of the present embodiment will be described with reference to FIG. 14.

Figure 14:
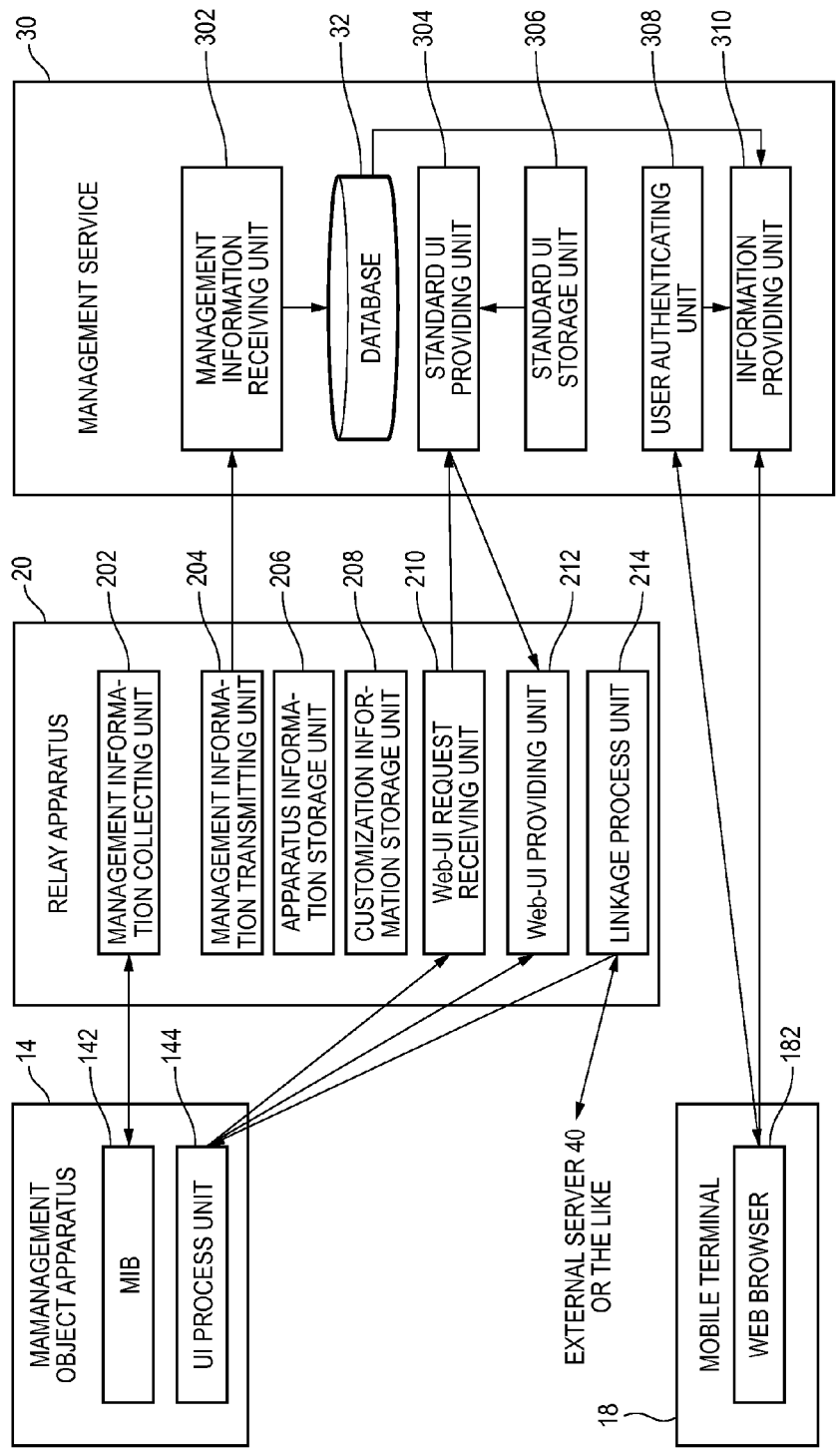
FIG. 14 is a view illustrating examples of the functional configurations of apparatuses constituting the system.

In the examples of FIG. 14, a management object apparatus 14 has a MIB 142 containing management information for managing the corresponding management object apparatus 14. The management information includes various setting information such as information (such as items "ID", "NAME", and "TYPE NAME") specifying the management object apparatus 14, information (such as an item "FIRMWARE VERSION") specifying software installed in the management object apparatus 14, and information (such as an item "COUNT VALUE" and an item "OPERATION STATE" having a value "ACTIVE" OR "OUT OF ORDER") representing the state of the management object apparatus 14. The information of the MIB 142 can be referred to from another apparatus (for example, the relay apparatus 20) located on the same local network 12, and the relay apparatus 20 can rewrite a specific information item of the MIB information.

Also, the management object apparatus 14 has a UI process unit 144. The UI process unit 144 displays a UI screen on the display of the management object apparatus 14, and recognizes an input of the user on the UI screen, and requests the control unit of the management object apparatus 14 or the relay apparatus 20 to perform a process according to the input. Thereafter, if the user issues a Web-UI display instruction, the UI process unit 144 transmits a Web-UI display request to the relay apparatus 20. If the relay apparatus 20 returns an individual UI in response to the Web-UI display request, the UI process unit 144 displays the individual UI on the display, and receives an input of the user on the individual UI.

A mobile terminal 18 has a web browser 182. Using the web browser 182, a user (the administrator of a corresponding management unit) accesses to the log-in page of the management service 30 and perform user authentication. If the user authentication succeeds, the user can view a Web page provided by the management service 30 and representing information of individual management object apparatuses 14 included in the management unit being under the administration of the user.

A relay apparatus 20 includes a management information collecting unit 202, a management information transmitting unit 204, an apparatus information storage unit 206, a customization information storage unit 208, a Web-UI request receiving unit 210, a Web-UI providing unit 212, and a linkage process unit 214.

The management information collecting unit 202 collects management information from management object apparatuses 14 (especially, for example, their MIBs 142) connected to a local network 12 to which the relay apparatus 20 is connected, using a SNMP or the like. The management information transmitting unit 204 transmits the management information of the management object apparatuses 14 collected by the management information collecting unit 202, to the management service 30. The apparatus information storage unit 206 stores information which is necessary to perform individual UI generation (customization) and is included in the information collected from each management object apparatus 14, for example, the apparatus ID, type, and customization contents of each management object apparatus 14 (see FIG. 7). The customization information storage unit 208 stores information to be used to perform individual UI generation (customization) (for example, information shown in FIGS. 10 to 13).

The Web-UI request receiving unit 210 receives a Web-UI display request from a management object apparatus 14. In response to the Web-UI display request, the Web-UI request receiving unit 210 requests a standard UI corresponding to the type of the corresponding management object apparatus 14, from the management service 30. The type of the management object apparatus 14 is acquired from information stored in the apparatus information storage unit 206.

If a standard UI is received, as a response of the request, from the management service 30, the Web-UI providing unit 212 customizes the standard UI, thereby generating an individual UI, and provides the generated individual UI to the management object apparatus 14 which is the request source. Also, if a user's instruction is input to the provided individual UI, the Web-UI providing unit 212 receives the user's instruction from the management object apparatus 14, and performs a process corresponding to the instruction. For example, if the user's instruction is start of copying, the Web-UI providing unit 212 instructs the management object apparatus 14 to start copying.

Meanwhile, if the user's instruction is, for example, performance of an external linkage process, the Web-UI providing unit 212 requests the linkage process unit 214 to perform the external linkage process corresponding to the instruction. The linkage process unit 214 performs control on the above described linkage process. For example, according to the flow of the requested linkage process (this flow is described, for example, in a job order), the linkage process unit 214 instructs an apparatus being in charge of each processes constituting the flow (the management object apparatus 14, the external server 40, or the like) to perform the corresponding process. Also, if necessary, the linkage process unit 214 receives the process result and transmits the process result to an apparatus being in charge of the next process of the flow.

For example, it is assumed that the user selects a storage destination by the "STORAGE DESTINATION" button on the "EXTERNAL LINKAGE" tab page shown in the individual UI 520 of FIG. 3, and pushes the "START" button. In this example, an external linkage is a process in which the management object apparatus 14 acquires an image by scanning, and the relay apparatus 20 stores the image in the storage destination selected from predetermined candidates (various storage services on the Internet) by the user. The relay apparatus 20 contains information (for example, a job order) defining that process. If the user pushes the "START" button, an external linkage process request including information on the storage destination selected by the user is transmitted from the UI process unit 144 to the Web-UI providing unit 212. If the external linkage process request is received, the Web-UI providing unit 212 requests the linkage process unit 214 to perform the external linkage process. According to the information such as a job order representing the contents of the external linkage process, the linkage process unit 214 first controls the management object apparatus 14 such that the management object apparatus 14 performs scanning, thereby acquiring a scan result image, and then transmits a request for registering a file containing the acquired image, to the external server 40 corresponding to the designated storage destination.

In the database 32 of the management service 30, the information on the individual relay apparatuses 20 exemplified in FIG. 2 is registered. A management information receiving unit 302 receives the management information from the management information transmitting unit 204 of each relay apparatus 20, and reflects the received management information in the information of the database 32 associated with the corresponding relay apparatus 20. For example, according to the item "COUNT VALUE" or "STATE" relative to a management object apparatus 14 and included in the received management information, the management information receiving unit 302 updates the item "COUNT VALUE" or "STATE" of the database 32 associated with the corresponding management object apparatus 14.

If the user accesses the management service 30 using the web browser 182 of a terminal such as a mobile terminal 18, a user authenticating unit 308 provides a log-in authentication screen to the user. If the user inputs authentication information such as a user name and a password to the authentication screen, the user authenticating unit 308 receives the input authentication information. Then, the user authenticating unit 308 performs authentication on the user, for example, by a known authentication process of checking the authentication information against user information registered in the management service 30. If it is determined by the authentication process that the user is a valid user registered in the management service 30, the user authenticating unit 308 allows an information providing unit 310 to provide information. The information providing unit 310 provides a management screen for the user. If the user inputs an instruction on the management screen, the information providing unit 310 provides management information which is included in the management information of the individual management object apparatuses 14 contained in the database 32 and for which the user has access authority as an administrator, or information obtained by analyzing the corresponding management information, for the user.

A standard UI storage unit 306 stores data on a standard UI corresponding to each of the types of the management object apparatuses 14. In response to a standard UI display request from the relay apparatus 20, a standard UI providing unit 304 reads data on a standard UI corresponding to a type designated in the standard UI display request, from the standard UI storage unit 306, and transmits the read standard UI data as a response to the relay apparatus 20.

The functions of the present system described with reference to FIGS. 1 to 13 are implemented by cooperation of the element group described with reference to FIG. 14.

<First Modification>

In the above embodiments, the management object apparatus 14 displays the individual UI transmitted from the relay apparatus 20. In the first modification, however, an example in which the management object apparatus 14 displays the individual UI in which an operation state of the management object apparatus 14 or a rule predetermined in the management object apparatus 14 is reflected will be described. As the operation state of the management object apparatus 14, there is, for example, copying of a plurality of documents by the management object apparatus 14 (such as a multi-function apparatus). As the rule predetermined in the management object apparatus 14, there is, for example, a rule which displays on the individual UI a message 602 representing that the management object apparatus 14 is operating and prohibits any other display at a position interfering the message 602 when the management object apparatus 14 (such as a multi-function apparatus) is operating.

The relay apparatus 20 acquires information representing the operation state or the rule from the management object apparatus 14. In this case, the information representing the operation state or the rule is received together with or being included in the device information. Since the information representing the operation state is updated frequently as compared with the device information of the above embodiments, at least information including the information representing the operation state is received for each change or at each predetermined time.

The relay apparatus 20 acquires the information representing the operation state of the management object apparatus 14 and the rule from the management object apparatus 14, generates the individual UI corresponding to that information, and transmits the individual UI to the management object apparatus 14. In addition, the relay apparatus 20 may generate the individual UI in which one of or both of the operation state and the rule is reflected.

Figure 15:
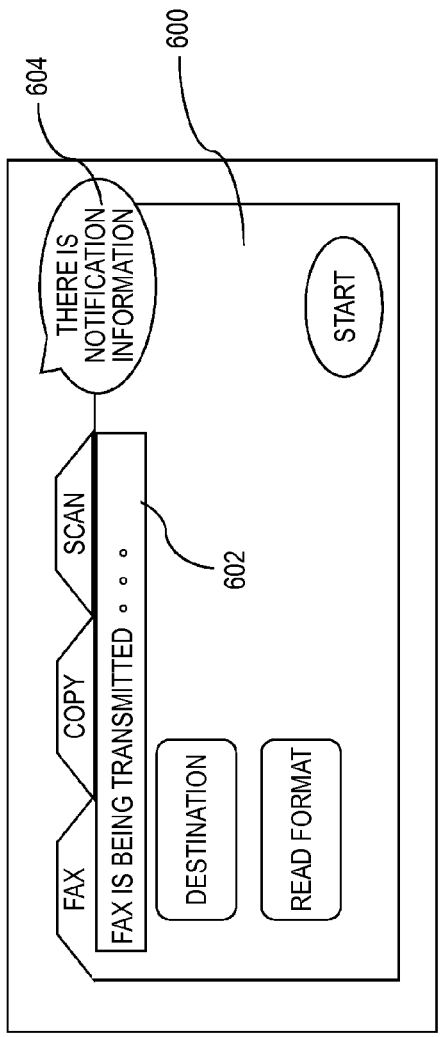
FIG. 15 is a view illustrating a display example of a UI screen of a management object apparatus displaying notification information from the management service.
Figure 16:
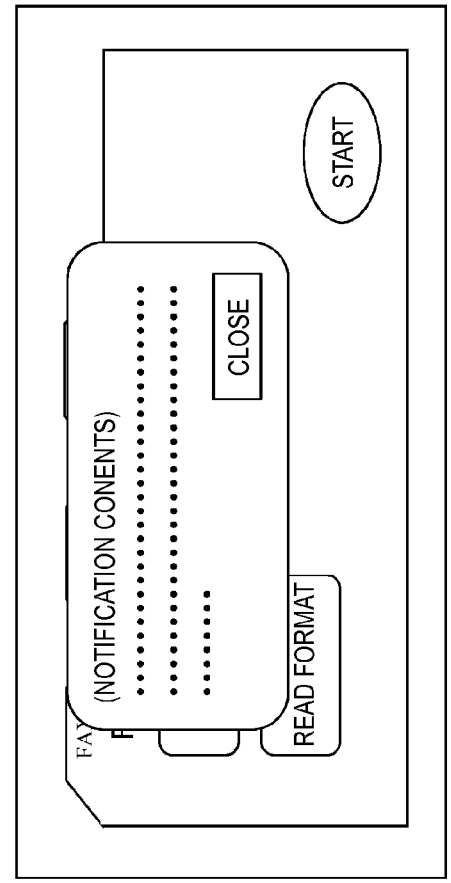
FIG. 16 is a view illustrating another display example of the UI screen of the management object apparatus displaying the notification information from the management service.

Specifically, in a case where there is urgent notification information such as emergency maintenance on the management service (30) side, a relay apparatus 20 receives the urgent notification information from the management service 30, and controls each management object apparatus 14 located on the same local network 12 such the corresponding management object apparatus 14 displays the urgent notification information on the display of its console. In this display control, for example, as shown in FIG. 15, the relay apparatus 20 controls each management object apparatus 14 such that the corresponding management object apparatus 14 displays an individual UI 600 on the display, and then controls each management object apparatus 14 such that the corresponding management object apparatus 14 visibly displays the urgent notification information at the top of the individual UI 600 (on the user side) (that is, so as to overlap the individual UI 600). For example, in a case where a management object apparatus 14 (for example, a multi-function apparatus) is operating, the management object apparatus 14 may display a message 602 representing that the management object apparatus 14 is operating, on the individual UI, and display notification information 604 so as not to hide the message. Alternatively, after the corresponding operation finishes, the management object apparatus 14 may display the corresponding notification information. Also, if a management object apparatus 14 displays a message representing that there is notification information, for example, in a popup form, like the notification information 604 of FIG. 15, so as not to hide display representing a current operation state, and if a user performs an operation such as a touch on the message, thereby inputting an instruction for displaying the contents of the notification information, the management object apparatus 14 may display the contents of the notification information. The contents of the notification information may be displayed so as not to disturb or hide the display of the current operation state, or may be displayed so as to disturb and hide the display of the current operation state (see FIG. 16). Inside a window for displaying the contents of the notification state, a GUI component such as a button for closing the window is provided (for example, at a position of the top). For example, a "CLOSE" button is provided in the popup window for displaying the notification contents information. If the "CLOSE" button is pushed by a user, the management object apparatus 14 returns to the state of FIG. 15.

In this way, in the first modification, the relay apparatus 20 acquires the information representing the operation state of the management object apparatus 14 or the rule from the management object apparatus 14, generates the individual UI corresponding to the acquired information and transmits the individual UI to the management object apparatus 14. Accordingly, the management object apparatus 14 can reflect the operation state of the management object apparatus 14 or the rule predetermined in the management object apparatus 14 in the individual UI which is transmitted from the relay apparatus 20.

<Second Modification>

A relay apparatus 20 may store standard UIs acquired from the management service 30 in order to reuse them later. In this case, the relay apparatus 20 stores the standard UIs in association with the types of corresponding management object apparatuses 14. In this case, if a standard UI display request is received from a management object apparatus 14, the relay apparatus 20 determines whether a standard UI corresponding to the type of the corresponding management object apparatus 14 is contained in the corresponding relay apparatus 20, and if a corresponding standard UI is contained in the relay apparatus 20, the relay apparatus 20 customizes the corresponding standard UI, thereby generating an individual UI, and provides the individual UI to the management object apparatus 14. In this case, the relay apparatus 20 does not transmit a standard UI display request to the management service 30. Only in a case where a corresponding standard UI is not contained in the relay apparatus 20, the relay apparatus 20 requests a standard UI corresponding to the type, from the management service 30.

Also, a relay apparatus 20 may store generated individual UIs in order to reuse them later. In this case, the relay apparatus 20 stores each individual UI in association with a combination of the type and customization contents of a corresponding management object apparatus 14. If a Web-UI display request is received from a management object apparatus 14, the relay apparatus 20 determines whether an individual UI corresponding to the combination of the type and customization contents of the corresponding management object apparatus 14 is contained in the corresponding relay apparatus 20, and if a corresponding individual UI is contained in the relay apparatus 20, the relay apparatus 20 provides the contained individual UI to the management object apparatus 14. In this case, the relay apparatus 20 does not need to request a standard UI from the management service 30 and customize the standard UI. Meanwhile, in a case where the relay apparatus 20 does not contain an individual UI corresponding to the combination of the type and customization contents of the management object apparatus 14 which is the request source, the relay apparatus 20 determines whether a standard UI corresponding to the corresponding type is contained in the relay apparatus 20, and if a corresponding standard UI is contained in the relay apparatus 20, the relay apparatus 20 customizes the standard UI, thereby generating an individual UI, and provides the generated individual UI to the management object apparatus 14 (the relay apparatus 20 does not request the standard UI from the management service 30). Meanwhile, in a case where a standard UI corresponding to the type of the management object apparatus 14 which is the request source is not contained in the relay apparatus 20, the relay apparatus 20 requests the standard UI of the corresponding type from the management service 30.

Also, in a case where the storage capacity of a relay apparatus 20 is limited, standard or individual UI storage may be managed as a cache of, for example, a least recently used (LRU) scheme.

<Third Modification>

A relay apparatus 20 performs exchange of various information and display information (such as UIs) with each management object apparatus 14 located on the same local network 12 and the management service 30, and stores the exchange history. Also, a relay apparatus 20 may transmit information on the number of output sheets and state information acquired from each management object apparatus 14, and stores the acquired information as a history in its own storage unit, in association with the acquisition date and time of the corresponding information.

<Fourth Modification>

In the above described embodiment, an additional function such as a linkage process function which is not inherent in a management object apparatus 14, and an individual UI which is a UI screen for the additional function are provided from a relay apparatus 20 to the management object apparatus 14.

By the way, although a relay apparatus 20 has an additional function such as a linkage process function to be provided to a management object apparatus 14, the corresponding management object apparatus 14 may not be able to practically use the additional function due to its performance. As an example of that case, there is a case where complicated operations inappropriate for practical use are required, like a case where since the display area (number of pixels) of the display of a management object apparatus 14 is small, a UI for inputting a lot of input items necessary for an additional function which a relay apparatus 20 will provide is composed of a plurality of screens, and thus a user needs to perform inputting while performing switching between the plurality of screens. Also, in a case where an external linkage function including an OCR process of the external server 40 is provided as an additional function, if the resolution of the scanning function of a management object apparatus 14 is lower than a resolution necessary to sufficiently secure the accuracy of the OCR process of the external server 40, even if the external linkage function is provided to the management object apparatus 14, it is not practical. As described above, even if a relay apparatus 20 provides an additional function to a management object apparatus 14 which is unable to practically use the additional function, it is useless. Therefore, in order to prevent confusion of a user, it is preferable that a UI for instructing performance of the additional function should not be provided.

For this reason, in the fourth modification, a relay apparatus 20 provides an individual UI including a UI for an additional function which a relay apparatus 20 provides, to a management object apparatus 14 which is able to practically use the additional function, and provides an individual UI which does not include a UI for the additional function, to a management object apparatus 14 which is unable to practically use the additional function. The relay apparatus 20 may determine whether it is possible to practically use an additional function, for each of the types of the management object apparatuses 14, or may determine whether it is possible to practically use an additional function, for each management object apparatus 14, in view of customization on the configuration. In order for this determination, the relay apparatus 20 contains determination information representing whether each type or each management object apparatus 14 can practically use the corresponding additional function. Then, on the occasion of customizing a standard UI corresponding to the type of a management object apparatus 14 in order to generate an individual UI, the relay apparatus 20 determines whether the corresponding management object apparatus 14 can practically use the additional function, with reference to the determination information. If determining that the corresponding management object apparatus 14 cannot practically use the additional function, the relay apparatus 20 does not include a UI for the additional function in the individual UI to be provided to the management object apparatus 14. That is, in this case, if the standard UI includes a UI for the additional function, the relay apparatus 20 removes the UI for the additional function from the standard UI, and if the standard UI does not include a UI for the additional function and the relay apparatus 20 is configured to add a UI for the additional function during customization, the relay apparatus 20 cancels the UI addition during customization. Also, in a case where a management object apparatus 14 which is the provision destination of an individual UI is of a type which can practically use the additional function, the relay apparatus 20 includes a UI for the additional function in the individual UI.

Fifth Embodiment

In the above described embodiment, the management service 30 collects and manages the information of the individual management object apparatuses 14, and manages and provides standard UIs for the individual management object apparatus 14. However, this is just an example. Naturally, an apparatus or a system different from the management service 30 may manage and provide the standard UIs.

<Others>

The relay apparatuses 20 and the management service 30 described above may each be implemented by causing a computer to execute a program representing the process of each function module of the corresponding apparatus. The computer has a circuit configuration in which pieces of hardware, for example, a microcomputer such as a CPU, memories (primary storage devices) such as a random-access memory (RAM) and a read-only memory (ROM), a secondary storage controller that controls secondary storage devices (such as a hard disk drive (HDD), a solid state drive (SSD), and a flash memory), various input/output (I/O) interfaces, network interfaces that control wired or wireless connection with a network, etc. are connected via a bus, for example. A disk drive that reads data from and/or writes data into a portable disc recording medium such as a CD, a DVD, or a flexible disk, a memory reader/writer that reads data from and/or writes data into a portable non-volatile recording medium according to various standards such as a flash memory, etc. may be connected to the bus, for example, through input/output (I/O) interfaces. A program that describes the contents of processes performed by the functional modules described above is stored in the secondary storage device such as a flash memory to be installed on the computer by way of a recording medium such as a CD and a DVD or by way of a communication unit such as a network. The program stored in the secondary storage device is read into the RAM and executed by the microprocessor such as a CPU, whereby the group of functional modules described above is implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An operation screen providing system comprising:
a relay apparatus and an operation screen providing apparatus,
wherein the relay apparatus includes a first processor configured to:
acquire type information representing a type of a processing apparatus, and customization information representing how an UI of the processing apparatus is customized from a standard UI, from the processing apparatus;

request the operation screen providing apparatus for the standard UI corresponding to the type information, if an operation screen request is received from the processing apparatus; and customize the standard UI provided from the operation screen providing apparatus in response to a request, according to the type information and the customization information, to generate an individual UI, and provide the generated individual UI to the processing apparatus which is a source of the operation screen request, wherein the operation screen providing apparatus includes a second processor configured to provide the standard UI corresponding to the type information to the relay apparatus in response to the request from the relay apparatus, and wherein the operation screen providing apparatus is physically separated from the processing apparatus.

2. The operation screen providing system according to claim 1, wherein the first processor is further configured to:

receive an input of a user on the individual UI displayed on the processing apparatus, from the processing apparatus; and perform a control of causing the processing apparatus or another apparatus to perform an instruction for performing a process represented by the input.

3. The operation screen providing system according to claim 1, wherein the relay apparatus is connected to a local network and the operation screen providing apparatus is connected to an external network other than the local network, such that the relay apparatus is communicable with the operation screen providing apparatus through the local network and the external network, and a plurality of processing apparatuses are connected to the local network, wherein the relay apparatus further includes a storage that stores the standard UI provided from the operation screen providing apparatus in response to the request, in association with the type information, and wherein in a case where the operation screen request is received from one of the processing apparatuses connected to the local network, in the relay apparatus, if the storage stores the standard UI corresponding to the type information of the one of the processing apparatuses, the first processor does not request the operation screen providing apparatus for the standard UI corresponding to the type information, and the first processor is configured to generate the individual UI using the standard UI stored in the storage.

4. The operation screen providing system according to claim 3, wherein the relay apparatus further includes a second storage that stores the individual UI generated by the first processor in association with the type information and the customization information, and wherein in a case where the operation screen request is received from one of the processing apparatuses connected to the local network, in the relay apparatus, if the second storage the individual UI corresponding to the type information and the customization information of the one of the processing apparatuses, the first processor does not request the operation screen providing apparatus for the standard UI corresponding to the type information, and the first processor provides the individual UI stored in the second storage to the one of the processing apparatuses.

5. The operation screen providing system according to claim 1, wherein the first processor is further configured to:

acquire information representing an operation state of the processing apparatus and information of a predetermined rule on the UI of the processing apparatus, from the processing apparatus; and provide the individual UI in which at least one of the operation state and the predetermined rule is reflected to the processing apparatus based on the information acquired.

6. The operation screen providing system according to claim 1, wherein the customization information includes at least one function unavailable to the processing apparatus by the standard UI.

7. A relay apparatus comprising a processor configured to:

acquire type information representing a type of a processing apparatus, and customization information representing how an UI of the processing apparatus is customized from a standard UI, from the processing apparatus;

requiescat an operation screen providing apparatus for the standard UI corresponding to the type information acquired, if an operation screen request is received from the processing apparatus; and customize the standard UI provided from the operation screen providing apparatus in response to a request, according to the type information and the customization information acquired, to generate an individual UI, and provide the generated individual UI to the processing apparatus which is a source of the operation screen request, wherein the operation screen providing apparatus is physically separated from the processing apparatus.

8. The relay apparatus according to claim 7, wherein the processor is further configured to:

receive an input of a user on the individual UI displayed on the processing apparatus, from the processing apparatus; and perform a control of causing the processing apparatus or another apparatus to perform an instruction for performing a process represented by the input.

9. The relay apparatus according to claim 7, wherein the relay apparatus is connected to a local network and the operation screen providing apparatus is connected to an external network other than the local network, such that the relay apparatus is communicable with the operation screen providing apparatus through the local network and the external network, and a plurality of processing apparatuses are connected to the local network, wherein the relay apparatus further includes a storage that stores the standard UI provided from the operation screen providing apparatus in response to the request, in association with the type information, and wherein in a case where the operation screen request is received from one of the processing apparatuses connected to the local network, if the storage stores the standard UI corresponding to the type information of the one of the processing apparatuses, the processor does not request the operation screen providing apparatus for the standard UI corresponding to the type information, and the processor is configured to generate the individual UI using the standard UI stored in the storage.

10. The relay apparatus according to claim 9, further comprising a second storage that stores the individual UI generated by the processor in association with the type information and the customization information, wherein in a case where the operation screen request is received from one of the processing apparatuses connected to the local network, if the second storage stores the individual UI corresponding to the type information and the customization information of the one of the processing apparatuses, the processor does not request the operation screen providing apparatus for the standard UI corresponding to the type information, and the processor is configured to provide the individual UI stored in the second storage to the one of the processing apparatuses.

11. The relay apparatus according to claim 7, wherein the processor is further configured to:

acquire information representing an operation state of the processing apparatus and information of a predetermined rule on the UI of the processing apparatus, from the processing apparatus, and provide the individual UI in which at least one of the operation state and the predetermined rule is reflected to the processing apparatus based on the information acquired.

12. The relay apparatus according to claim 7, wherein the customization information includes at least one function unavailable to the processing apparatus by the standard UI.

13. An operation screen providing method comprising:

acquiring, by a processor, type information representing a type of a processing apparatus, and customization information representing how an UI of the processing apparatus is customized from a standard UI, from the processing apparatus;

requesting, by the processor, an operation screen providing apparatus for the standard UI corresponding to the acquired type information, if an operation screen request is received from the processing apparatus; and customizing, by the processor, the standard UI provided from the operation screen providing apparatus in response to the requesting, according to the acquired type information and the acquired customization information, to generate an individual UI, and providing the generated individual UI to the processing apparatus which is a source of the operation screen request, wherein the operation screen providing apparatus is physically separated from the processing apparatus.

14. The operation screen providing method according to claim 13, wherein the customization information includes at least one function unavailable to the processing apparatus by the standard UI.

15. A non-transitory computer readable medium storing a program for causing a computer to execute an operation screen providing process, the process comprising:

acquiring type information representing a type of a processing apparatus, and customization information representing how an UI of the processing apparatus is customized from a standard UI, from the processing apparatus;

requesting an operation screen providing apparatus for the standard UI corresponding to the acquired type information, if an operation screen request is received from the processing apparatus; and customizing the standard UI provided from the operation screen providing apparatus in response to the requesting, according to the acquired type information and the acquired customization information, to generate an individual UI, and providing the generated individual UI to the processing apparatus which is a source of the operation screen request, wherein the operation screen providing apparatus is physically separated from the processing apparatus.

16. The non-transitory computer readable medium according to claim 15, wherein the customization information includes at least one function unavailable to the processing apparatus by the standard UI.

\* \* \* \* \*